United States Patent
Baldemair et al.

(10) Patent No.: US 8,144,819 B2
(45) Date of Patent: Mar. 27, 2012

(54) SYNCHRONIZATION FOR CHIRP SEQUENCES

(75) Inventors: Robert Baldemair, Solna (SE); Bengt Lindoff, Bjärred (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 976 days.

(21) Appl. No.: 12/024,765

(22) Filed: Feb. 1, 2008

(65) Prior Publication Data

US 2008/0267303 A1    Oct. 30, 2008

Related U.S. Application Data

(60) Provisional application No. 60/914,891, filed on Apr. 30, 2007.

(51) Int. Cl.
*H04L 27/06* (2006.01)
(52) U.S. Cl. .......................................... 375/343
(58) Field of Classification Search .................. 375/142, 375/150, 152, 343; 708/314, 422, 426
See application file for complete search history.

(56) References Cited

U.S. PATENT DOCUMENTS

| | | | |
|---|---|---|---|
| 4,800,518 A | 1/1989 | Miller | |
| 4,964,138 A | 10/1990 | Nease et al. | |
| 7,003,022 B2 | 2/2006 | Urabe et al. | |
| 7,006,587 B1 | 2/2006 | Lewis et al. | |
| 7,095,811 B1 * | 8/2006 | Shikh-Bahaei et al. | 375/340 |
| 2006/0050799 A1 | 3/2006 | Hou et al. | |
| 2006/0171493 A1 * | 8/2006 | Kim et al. | 375/343 |
| 2007/0047433 A1 * | 3/2007 | Kao | 370/208 |
| 2007/0140106 A1 | 6/2007 | Tsai et al. | |
| 2007/0211835 A1 * | 9/2007 | Inagawa et al. | 375/343 |
| 2008/0031368 A1 | 2/2008 | Lindoff et al. | |

FOREIGN PATENT DOCUMENTS

| | | |
|---|---|---|
| GB | 2 320 868 A | 7/1998 |
| GB | 2 396 085 A | 6/2004 |
| WO | 2008081311 A2 | 10/2008 |

OTHER PUBLICATIONS

Liang, T. et al.: "Synchronization in OFDM-based WLAN with transmit and receive diversities" IEEE 16th International Symposium on Personal, Indoor and Mobile Radio Communications, 2005, PIMRC 2005. Sep. 11-14, 2005, vol. 2, pp. 740-744, ISBN: 9783800729098.
3GPP Technical Report TR 25.814, "Physical layer aspects for evolved Universal Terrestrial Radio Access (UTRA) (Release 7)", Jun. 2006.
"UMTS Long Term Evolution (LTE) Technology Introduction" Application Note 1MA111, Rohde & Schwarz, 2007.
3GPP TSG RAN WG1 Meeting #48 "Comparision of Golay-Hadamard and Zadoff-Chu S-SCH sequences" Mar. 26-30, 2007, St. Julian's, Malta, R1-071405.

(Continued)

*Primary Examiner* — Young T. Tse
(74) *Attorney, Agent, or Firm* — Potomac Patent Group PLLC

(57) ABSTRACT

Methods and apparatus for identifying correct peaks in outputs of matched filters in user equipment for communication systems are provided. A received signal is correlated with a replica of a synchronization signal, thereby producing a correlation output signal. Peaks are detected in the correlation output signal. The peak is tested at a plurality of predetermined locations that are based on properties of the synchronization signal, thereby producing a plurality of peak test signals. The maximum of the peak test signals is determined.

22 Claims, 7 Drawing Sheets

OTHER PUBLICATIONS

3GPP TSG RAN WG1 Meeting #48bis "Efficient matched filters for paired root Zadoff-Chu sequences" Mar. 26-30, 2007, St. Julian's, Malta, R1-071409.

"Long Term Evolution (LTE): Overview of LTE Air-Interface" Technical White Paper, Motorola, Inc., 2007.

Zyren, Jim: "Overview of the 3GPP Long Term Evolution Physical Layer" White Paper, Freescale Semiconductor, Jul. 2007.

3GPP Technical Specification TS 36.211 V8.1.0, Physical Channels and Modulation (Release 8), Nov. 2007.

PCT Written Opinion (and international search report), mailed Nov. 26, 2008, in connection with International Application No. PCT/EP2008/054262.

* cited by examiner

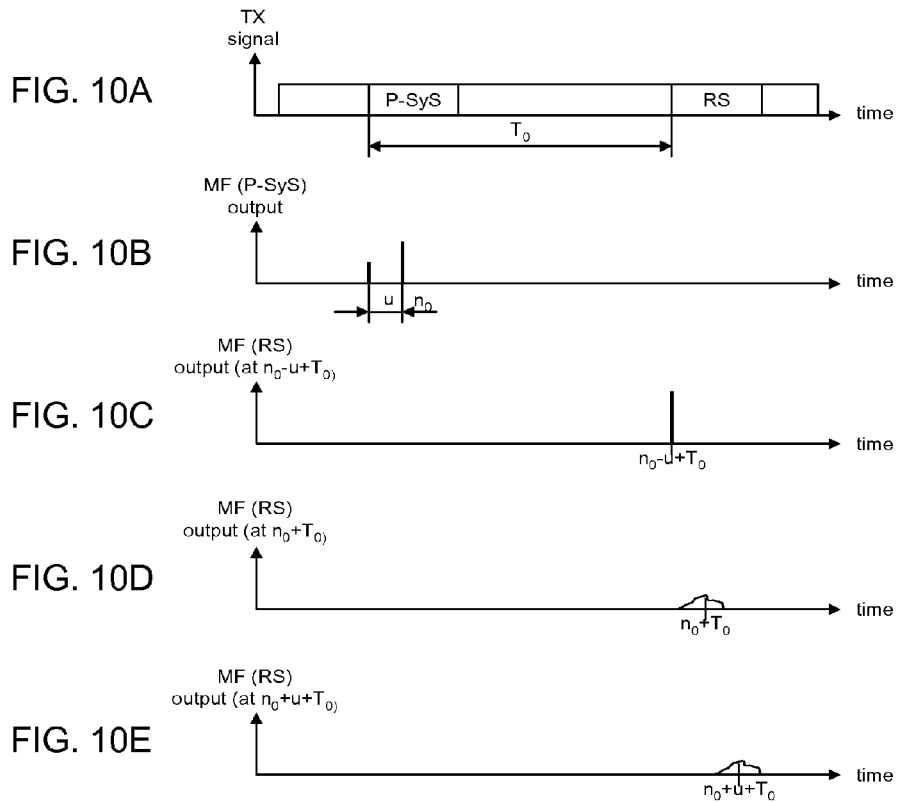
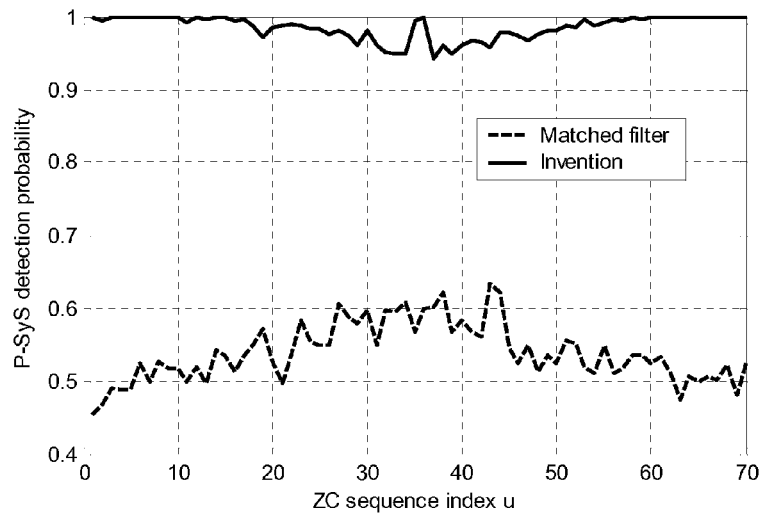
FIG. 13

SYNCHRONIZATION FOR CHIRP SEQUENCES

This application claims the benefit of the filing date of U.S. Provisional Patent Application No. 60/914,891 filed on Apr. 30, 2007, which is expressly incorporated here by reference.

BACKGROUND

The Third Generation Partnership Project (3GPP) Technical Report (TR) 25.814 V7.0.0, Physical Layer Aspects for Evolved Universal Terrestrial Radio Access (UTRA) (Release 7), June 2006, and 3GPP Technical Specification (TS) 36.211 V8.1.0, Physical Channels and Modulation (Release 8), November 2007, describe the physical layer of an evolved UTRA network (E-UTRAN) able to operate over a very wide range of operating channel bandwidths and carrier frequencies and with small-diameter "micro" cells up to large-diameter "macro" cells having 100-km cell ranges. 3GPP promulgates specifications that standardize many kinds of cellular wireless communication systems.

FIG. 1 depicts a typical cellular wireless telecommunication system 10. Radio network controllers (RNCs) 12, 14 control various radio network functions, including for example radio access bearer setup, diversity handover, etc. In general, each RNC directs calls to and from a mobile station (MS), or remote terminal or user equipment (UE), via the appropriate base station(s) (BSs), which communicate with each other through downlink (DL) (i.e., base-to-mobile or forward) and UL (i.e., mobile-to-base or reverse) channels. In FIG. 1, RNC 12 is shown coupled to BSs 16, 18, 20, and RNC 14 is shown coupled to BSs 22, 24, 26.

Each BS, or Node B in 3G vocabulary, serves a geographical area that is divided into one or more cell(s). In FIG. 1, BS 26 is shown as having five antenna sectors S1-S5, which can be said to make up the cell of the BS 26, although a sector or other area served by signals from a BS can also be called a cell. In addition, a BS may use more than one antenna to transmit signals to a UE. The BSs are typically coupled to their corresponding RNCs by dedicated telephone lines, optical fiber links, microwave links, etc. The RNCs 12, 14 are connected with external networks such as the public switched telephone network (PSTN), the internet, etc. through one or more core network nodes, such as a mobile switching center (not shown) and/or a packet radio service node (not shown).

It should be understood that the arrangement of functionalities depicted in FIG. 1 may be modified in an E-UTRAN and other communication networks. For example, the functionality of the RNCs 12, 14 may be moved to the node Bs 22, 24, 26, and other functionalities may be moved to other nodes in the network.

In order to handle the different radio conditions that may occur in an E-UTRAN, orthogonal frequency division multiplexing (OFDM), or orthogonal frequency division multiple access (OFDMA), is used in the downlink. OFDMA is a radio access technology (RAT) that can adapt to the different radio propagation conditions that can occur in an E-UTRAN. In particular, an OFDM system can adapt its DL transmission parameters not only in the time domain, as in current communication systems, but also in the frequency domain. OFDMA communication systems are also described in the literature, for example, U.S. patent application Ser. No. 11/289,184 by B. Lindoff et al.

In an OFDMA communication system, the available data stream is portioned into a number of narrowband subcarriers that are transmitted in parallel. Because each subcarrier is narrowband, each carrier experiences only flat-fading, which makes it easy to demodulate each subcarrier. A basic time-frequency structure of a DL in an OFDM system is depicted in FIG. 2, which shows a plurality of OFDM sub-carriers that are contiguous in the frequency direction. The radio resource devoted to a particular user may be called a "block" or a "chunk", which is a particular number of particular sub-carriers used for a particular period of time. Different groups of sub-carriers are used at different times for different users, and FIG. 2 illustrates resource blocks for four users A, B, C, D. In the downlink of the exemplary OFDM system depicted by FIG. 2, a block includes 12 sub-carriers (not all of which are shown, for clarity) spaced apart by 15 kilohertz (kHz), which together occupy approximately 180 kHz in frequency, and 1.0 millisecond (ms) in time. It will be understood that the arrangement of FIG. 2 is just an example and that other arrangements can be used.

For receiver synchronization and other purposes, reference symbols or signals, which may be called pilots, can be transmitted from each base station at known frequency and time instants. Such reference signals are described for example in Section 7.1.1.2.2 of 3GPP TR 25.814 and Sections 6.10 and 6.11 of 3GPP TS 36.211. An exemplary time-frequency structure with eight such pilots 302 is depicted in FIG. 3, which shows eight sub-carriers having the pilots 302 in the OFDM time-frequency plane. Other OFDM sub-carriers 304 transport data, but for clarity these are indicated in FIG. 3 at only one instant in the time-frequency plane. It will be understood that each resource block typically includes a few pilots on different sub-carriers. It will also be understood that a BS may use multiple transmit antennas to transmit information into a cell/sector/area, and those different transmit antennas may send respective, different pilots.

According to Section 7.1.2.4 of 3GPP TR 25.814 and Sections 6.11 and 5.7 of 3GPP TS 36.211, an E-UTRAN has initial access channels, such as a Synchronization Signal (SyS) and a random-access channel (RACH), that are robust, enabling a UE to access the system under many different radio conditions. The SyS in E-UTRAN consists of a Primary Synchronization Signal (P-SyS) and a Secondary Synchronization Signal (S-SyS). Three P-SyS are currently defined in E-UTRAN and are distributed over the E-UTRAN cells. Comparable synchronization and random-access channels are often provided in other digital communication systems, although they may be given different names.

In order to access the network, a UE carries out a cell-search algorithm that starts with the UE's correlating its received signal with its local replicas of all three P-SyS to synchronize itself with the system timing. After this step, the UE knows the position of the S-SyS and proceeds to a second stage of the cell-search algorithm, in which the UE decodes the S-SyS, which contains the cell's group identification (ID). The cell's group ID, together with the information about which of the three P-SyS is present, establishes the physical-layer cell ID of the cell. The UE then has all the information it needs to read broadcast system information and establish communication with the network.

The P-SyS in E-UTRAN are based on Zadoff-Chu (ZC) sequences, which are a special class of generalized chirp-like (GCL) sequences. A ZC sequence having a length N, where N is odd, and a sequence index u is defined by the following expression:

$$Z_u(k) = \exp(-j\pi/N \cdot u \cdot k \cdot (k+1)), k=0,1,\ldots,N-1.$$

The three different P-SyS signals in E-UTRAN are ZC sequences of the same length N with different sequence indices u.

ZC sequences have special properties, some of which are desirable but some which need special attention. On the positive side, ZC sequences belong to the class of CAZAC sequences, which have Constant Amplitude (CA), constant magnitude cross-correlations across all lags and a Zero Auto-Correlation (ZAC) for lags not equal to zero. These properties make ZC sequences very attractive for synchronization applications. On the negative side, the auto-correlation behavior of ZC sequences in the presence of frequency offsets needs to be considered because it produces multiple peaks in the auto-correlation signal that interfere with accurate synchronization.

With multiple peaks in the autocorrelation signal, it can be difficult for a UE to decide which peak is the correct one and achieve proper synchronization. If extra receiver components or functions are implemented to identify the correct autocorrelation peak, several disadvantages are introduced. The receiver is made more complex, and the area of a semiconductor chip required for such processing as well as the amount of electrical energy consumed by such processing are increased. The greater energy consumption decreases the life time of battery-powered UEs, such as mobile phones, pagers, etc.

SUMMARY

In accordance with aspects of this invention, there is provided a method of identifying a correct peak in an output of a matched filter in a user equipment for a communication system. The method includes the steps of correlating a received orthogonal frequency division multiplex signal with a replica of a synchronization signal, thereby producing a correlation output signal; detecting peaks in the correlation output signal; testing the peaks at a plurality of predetermined locations that are based on properties of the synchronization signal, thereby producing a plurality of peak test signals; and determining the maximum of the peak test signals.

Also in accordance with aspects of this invention, there is provided an apparatus in a receiver for identifying a correct peak in an output of a matched filter. The apparatus includes a matched filter configured to correlate a received orthogonal frequency division multiplex signal with a replica of a synchronization signal, and thereby to produce a correlation output signal; a peak detector configured to detect peaks in the correlation output signal; and a processor configured to test the peaks at a plurality of predetermined locations that are based on properties of the synchronization signal, and thereby to produce a plurality of peak test signals, and to determine the maximum of the peak test signals.

Also in accordance with aspects of this invention, there is provided a computer-readable medium encoded with a computer program which, when executed by the computer, causes the computer to perform a method of identifying a correct peak in an output of a matched filter in a user equipment for a communication system. The method includes the steps of correlating a received orthogonal frequency division multiplex signal with a replica of a synchronization signal, thereby producing a correlation output signal; detecting peaks in the correlation output signal; testing the peaks at a plurality of predetermined locations that are based on properties of the synchronization signal, thereby producing a plurality of peak test signals; and determining the maximum of the peak test signals.

BRIEF DESCRIPTION OF THE DRAWINGS

The several features, advantages, and objects of this invention will be understood by reading this description in conjunction with the drawings, in which:

FIG. 10A depicts a transmitted signal having a reference signal;

FIGS. 10B, 10C, 10D, and 10E depict the output of a receiver's matched filter at different times for the transmitted signal of FIG. 10A;

FIGS. 12, 13, and 14 are plots of detection probability versus sequence index.

DETAILED DESCRIPTION

It will be understood that this invention is not limited to ZC sequences or communication systems that map ZC sequences to subcarriers of an OFDM signal as described above. Other types of sequences that may have the same frequency-offset behavior as ZC sequences are, for example, other GCL sequences. In addition, it does not matter whether the length M of the IFFT and the length N of the ZC sequence are equal or M>N because in the latter case the IFFT performs interpolation, and so the principal behavior is still the same. Furthermore, it does not matter whether the ZC sequence is mapped in the time- or frequency-domain because a ZC sequence transformed by an IFFT results in a CAZAC sequence again. In addition, this application focusses on OFDM systems simply for economy of explanation, but it will be understood that the principles described in this application can be implemented in other digital communication systems.

Figure 1:
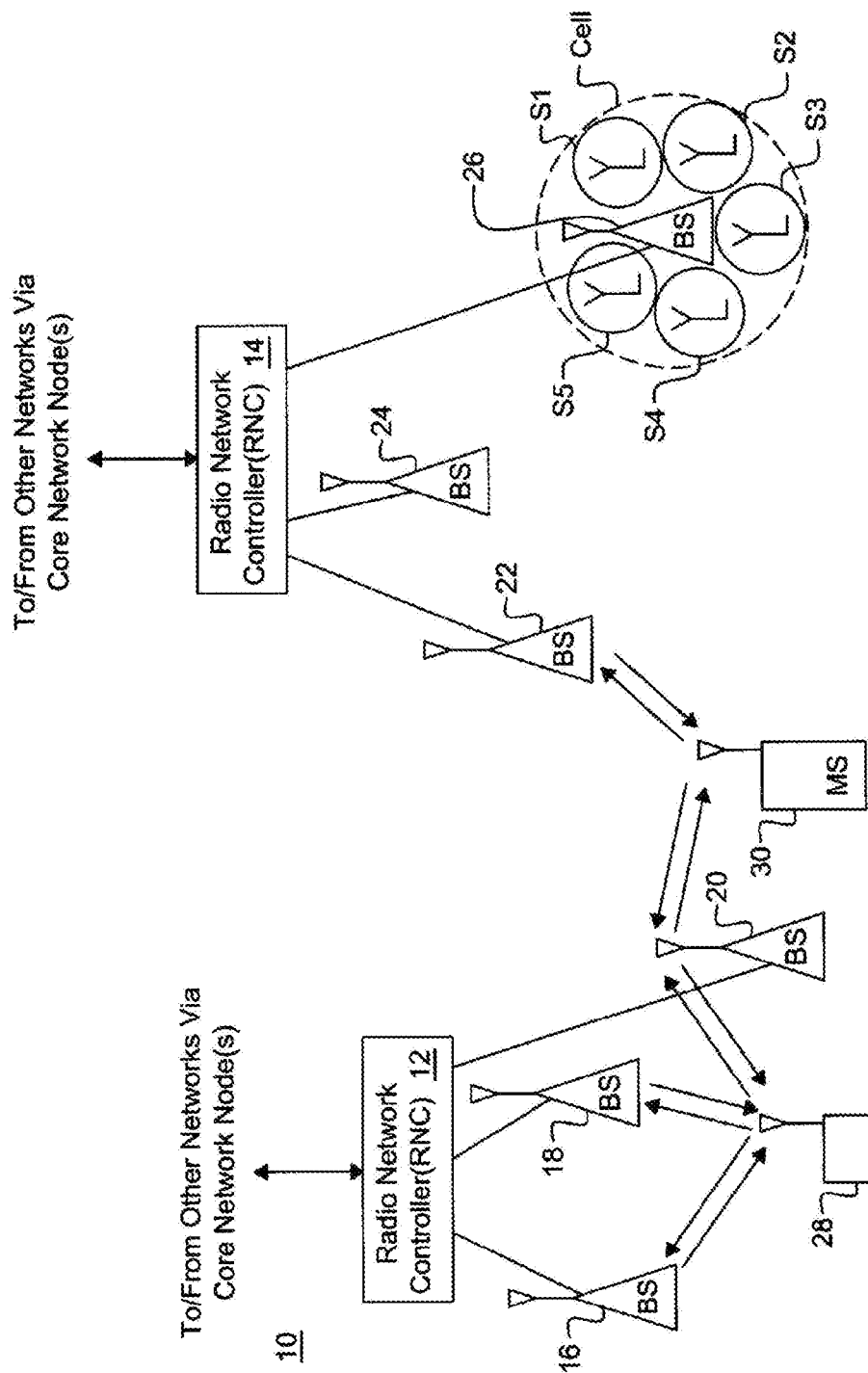
FIG. 1 depicts a cellular radio communication system.
Figure 2:
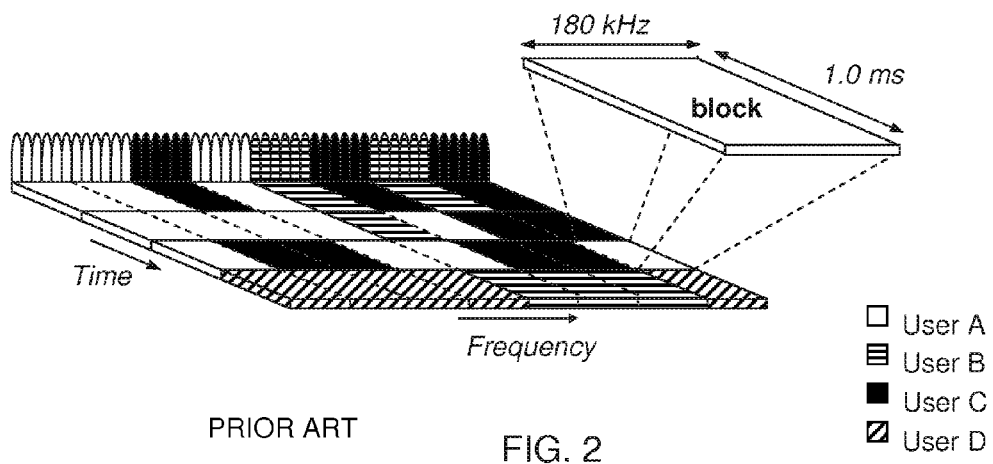
FIG. 2 depicts a time and frequency arrangement of sub-carriers in a communication system using orthogonal frequency division multiplexing.
Figure 3:
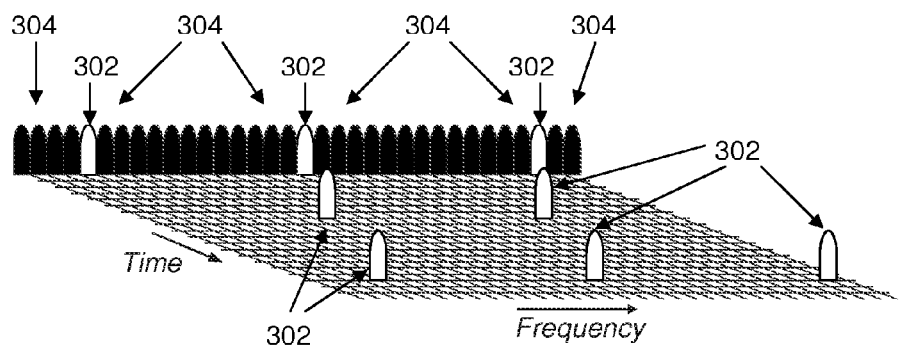
FIG. 3 depicts a time and frequency arrangement of sub-carriers that include pilot signals.
Figure 4:
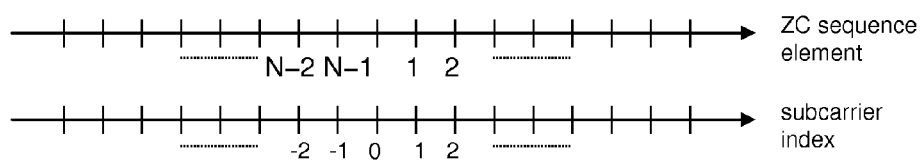
FIG. 4 illustrates a relation between elements of a synchronization sequence and sub-carriers.

For the following discussion, assume that a P-SyS is generated by mapping in the frequency domain a ZC sequence of length N to the subcarriers of an OFDMA signal and then transforming into the time-domain with an inverse fast Fourier transform (IFFT). Such generation in the frequency domain is illustrated by FIG. 4, which depicts the elements of a ZC sequence and the sub-carriers of an OFDMA signal as ticks on respective horizontal lines that are aligned suitably. It will be understood that the arrangement of FIG. 4 is just an example and that other arrangements can be used.

To handle an unknown frequency offset, a UE can have a receiver that includes some kind of correlator that is matched to the time-domain representation of the P-SyS or equivalent synchronization signal, which is to say that the receiver includes a matched filter having an impulse response that corresponds to a mirrored (time-reversed) complex-conjugate of the P-SyS. To handle an unknown frequency offset, several matched filters are implemented in the receiver, with each of the several matched filters having an impulse response matched to the synchronization signal with a different respective assumed frequency offset.

Figure 5:
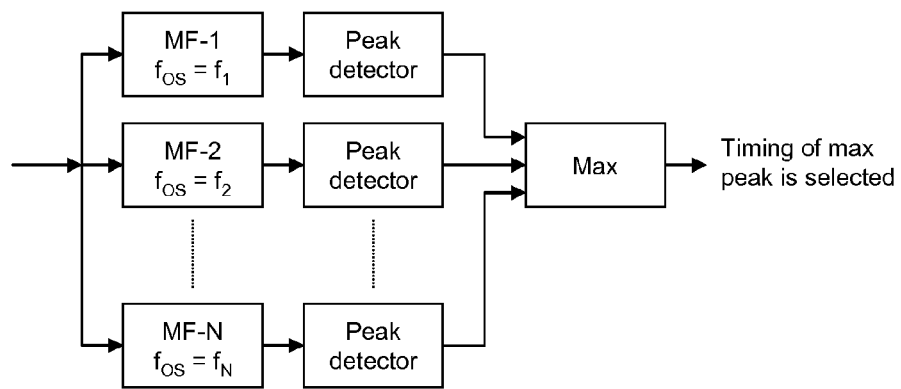
FIG. 5 is a block diagram of a portion of a receiver in a communication system.

FIG. 5 is a block diagram of a portion of a UE receiver that has N matched filters MF-1, MF-2, . . . , MF-N and N respective peak detectors that provide their output signals to a maximum detector Max. The N matched filters are run in parallel, with each filter assuming a different respective frequency offset $f_{OS}$. The maximum detector Max essentially compares the outputs of all of the matched filters and selects that filter having the highest peak for use in further detection of the P-SyS timing and UE-base station synchronization. Such matched filters can be implemented in hardware devices, such as tapped delay lines, correlators that compare input sequences to expected sequences, and equivalent devices, or as software algorithms executed by a programmable processor in the UE. For example, U.S. Pat. No. 7,003,022 to Urabe et al. describes matched filters and receivers for mobile radio communication systems.

Figure 6:
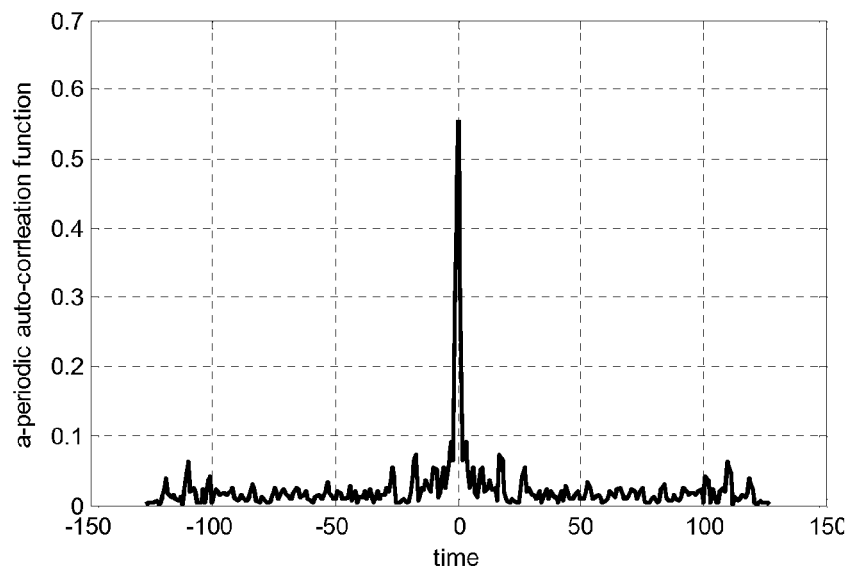
FIG. 6 is a plot of the magnitude of an aperiodic auto-correlation function versus time in the absence of frequency offset.

If the frequency of the UE's local oscillator (not shown in FIG. 5), which is used to translate the UE's received signal from radio frequencies to base band, is exactly the same as the frequency of the base station's oscillator, which is used to generate the base station's transmitted signal, and if Doppler frequency shifts can be neglected, the output signal produced by one of the UE receiver's matched filters may look like FIG. 6. No noise is assumed in FIG. 6, which is a plot of the magnitude of the P-SyS aperiodic auto-correlation function versus time. It will be observed that the output signal depicted in FIG. 6 possesses a single sharp peak, which is easy to detect and allows reliable determination of the P-SyS timing and good UE-base station synchronization.

Figure 7:
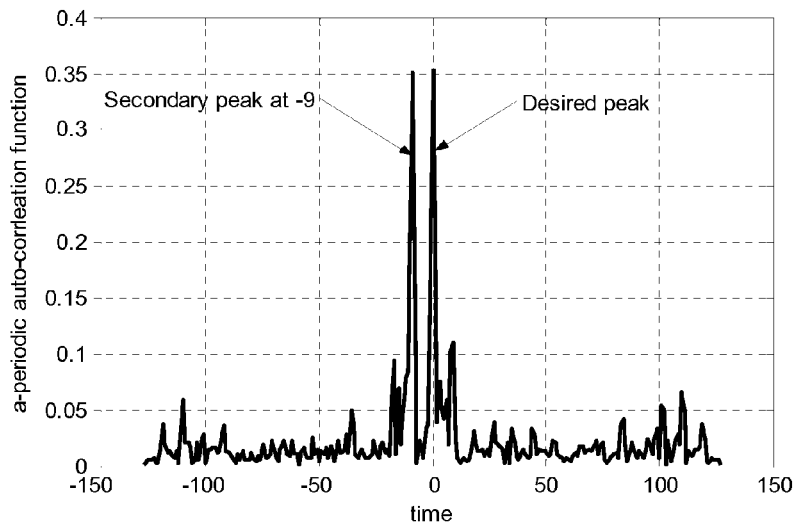
FIG. 7 is a plot of the magnitude of an aperiodic auto-correlation function versus time in the presence of frequency offset.

FIG. 7 depicts an output signal that might be produced by a matched filter in the UE receiver when the matched filter's assumed frequency offset differs from the frequency offset of the demodulated baseband signal by half the bandwidth of a sub-carrier of the OFDMA signal. Instead of one sharp peak, the matched filter output signal contains two significant peaks, one of which is at the proper timing and the other of which is 9 time units earlier. The peak at the proper timing can be called the "main" peak, and the peak that is displaced can be called a "secondary" peak. Compared to FIG. 6, the magnitudes of both the main and secondary peaks are also reduced, among other noticeable differences.

In any event, it is impossible for a UE to decide which peak is the correct one in an autocorrelation (matched filter) output signal as depicted in FIG. 7. The arrangement in FIG. 5, with multiple matched filters running in parallel with different assumed frequency offsets, is one way to deal with this problem. It is assumed that one of the multiple matched filters will have an assumed frequency offset that is close to the actual offset, yielding a largest output signal. Nevertheless, it is desirable to avoid the additional complexity and other disadvantages of a receiver having multiple matched filters.

The inventors have recognized that the location of the main secondary autocorrelation peak in FIG. 7 is independent of the amount of the frequency offset, provided that that amount is of the order of the sub-carrier bandwidth or less. More generally, the inventors have recognized that secondary peaks in the autocorrelation output signal occur at $n_0 \pm uL$ and $n_0 \pm u(L-1)$, where L is a positive integer that is the smallest multiple of sub-carrier bandwidth df that is larger than the magnitude $|f_{OS}|$ of the frequency offset $f_{OS}$, u is the ZC sequence index, $n_0$ is the correct peak position, and $f_{OS}$ is bounded as follows: $(L-1)df \leq |f_{OS}| \leq Ldf$. The sign of the frequency offset determines which sign is used in the above equations.

In particular, for a frequency offset less than one subcarrier bandwidth (i.e., L=1), the secondary peak occurs at $n_0 \pm u$, which is otherwise independent of the amount of the frequency offset. If the frequency offset is exactly one subcarrier bandwidth (i.e., $f_{OS}=df$), the main peak at $n_0$ disappears and only the secondary peak remains at $n_0+u$ or $n_0-u$, depending on the sign of the frequency offset. For frequency offsets larger than one subcarrier bandwidth and smaller than two sub-carrier bandwidths, an additional secondary peak occurs with the secondary peak due to a frequency offset equal to two sub-carrier bandwidths (i.e., at $n_0 \pm 2u$). For a frequency offset equal to two sub-carrier bandwidths (i.e., $f_{OS}=2df$), the secondary peak due to a frequency offset equal to one sub-carrier bandwidth (i.e., at $n_0 \pm u$) vanishes and only the new secondary peak remains.

As noted above, in general, for a frequency offset equal to an integer multiple of the sub-carrier bandwidth, only a single peak exists at a location completely determined by the frequency offset and the ZC sequence itself. For a frequency offset between (L−1) and L times the sub-carrier bandwidth, the secondary correlation peaks are composed from the correlation peaks present at frequency offset (L−1) and L times the sub-carrier bandwidth. It will be appreciated that the preceding explanation is exact only for frequency offsets equal to integer multiples of the subcarrier bandwidth. For other frequency offsets, other—much more attenuated—peaks occur in addition to the secondary peaks described above that are omitted for the sake of clarity of discussion. It will be further appreciated that the preceding explanation is exact for a periodic autocorrelation signal and is a reasonable approximation for cases of an aperiodic autocorrelation output signal of a matched filter.

Thus, the inventors have recognized that the distance between the desired main peak position and secondary peaks in the output signals of matched filters in a receiver is determined by the ZC sequence index u, and whether a secondary peak leads or trails the main peak is determined by the sign of the frequency offset. The secondary peaks of the autocorrelation function are located at (L−1)u and Lu (in a modulo-N sense) time units relative to the position of the true autocorrelation peak.

Figure 8:
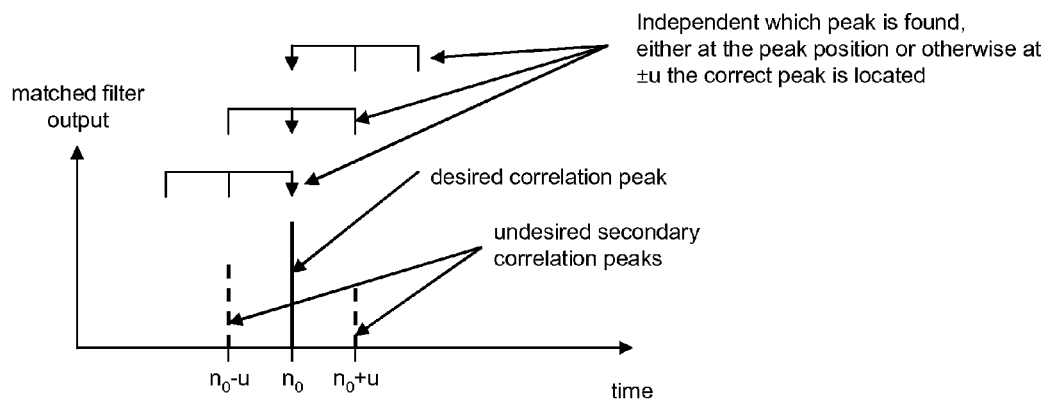
FIG. 8 illustrates locations of secondary peaks in an aperiodic auto-correlation function.

FIG. 8 illustrates that the locations of secondary peaks are determined by the ZC sequence index u. For a main peak at time instant $n_0$, a secondary peak can occur only at either time instant $n_0+u$ or time instant $n_0-u$, assuming a frequency offset that is smaller than a sub-carrier bandwidth. Independent of which peak of the correlation signal is found by a peak detector, the inventors have recognized that the main peak can always be identified by testing the found peak and the positions at ±u relative to the found peak. If the P-SyS is interpolated (e.g., by using an IFFT size M that is larger than the ZC sequence length N), the displacement of the secondary peaks is ±round(u·M/N), where the notation round( ) indicates a round-off function. As seen in the example of FIG. 7, in which the sequence index u=5, M=128, and N=71, the secondary peak is localized at −round(5·128/71)=−9. For frequency offsets larger than one sub-carrier bandwidth, the secondary autocorrelation peaks appear at (L−1)u and Lu (in a modulo-N sense) relative to the true peak at $n_0$.

Thus, a receiver in accordance with this invention can have reduced complexity by replacing a bank of matched filters with one matched filter in the P-SyS detector to identify the correct peak and find the P-SyS timing. The matched filter can be a correlator matched to the P-SyS, and such a correlator, which can be realized by a suitably programmed or configured electronic processor, tapped delay line, etc., is used as a primary synchronization device. If a main peak is detected, the position of this (assumed) correct peak ($n_0$) together with the positions of the secondary peaks (e.g., at $n_0 \pm u$) is tested to identify which peak is the correct one. If frequency offsets larger than one sub-carrier bandwidth can be present, additional hypotheses at $n_0 \pm (L-1)u$ and $n_0 \pm Lu$ (understood in a modulo-N sense) are tested with the hypothesis at $n_0$.

Figure 9:
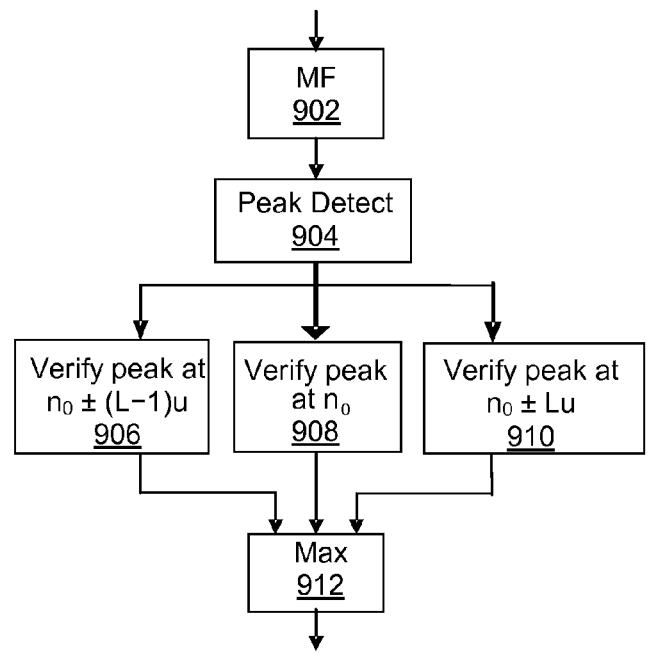
FIG. 9 is a flow diagram of a procedure for identifying the proper peak in the output of a matched filter.

A flow diagram of a procedure for identifying the proper peak in the output of a matched filter is depicted in FIG. 9. The method begins in step 902 with matched-filtering (MF) a signal, such as a P-SyS, for example by correlating the signal with a local replica, which may be stored, of an expected signal. The method continues in step 904 with detecting a peak in an output signal produced by the matched-filtering step. In steps 906, 908, 910, a detected peak is tested, or verified, at predetermined locations that are based on properties of the expected signal. As described above for the case of a ZC sequence as the expected signal, the predetermined locations are $n_0 \pm (L-1)u$ and $n_0 \pm Lu$ in general, and $n_0$ and $n_0 \pm u$ in the case of an expected frequency offset less than the sub-carrier bandwidth. In step 912, the maximum of the verifications at the predetermined locations is determined, thereby identifying the proper peak.

It will be appreciated that when the frequency offset $f_{OS}$ is less than the sub-carrier bandwidth df, the three locations to test are $n_0$ and $n_0 \pm u$, and when the frequency offset is larger than df, those locations are $n_0$, $n_0 \pm (L-1)u$, and $n_0 \pm Lu$. If one does not know the size of the frequency offset, the receiver should look for peaks at $(n_0 \pm Lu)$ for all L, i.e., for l=1, 2, ..., L.

Testing the peaks at $n_0$ and $(n_0 \pm (L-1)u)$ and $(n_0 \pm Lu)$ (steps 906-910) can be done in several ways. One way is to assume that each particular peak under test is correct and act on those assumptions, e.g., by initiating detection of the S-SyS or another signal at each of the identified peaks. As a result of this sort of "blind" detection, it is likely that the S-SyS detection processes at the "wrong" peaks will fail or possess a much lower confidence level than the S-SyS detection at the correct peak.

Another way to test the peaks is to test each against a known signal, assuming that the currently tested peak is the correct one. For example, if at a certain time after the P-SyS a known signal, e.g., a reference signal, occurs, the receiver at each timing hypothesis correlates with the known signal. This way of testing matched-filter output peaks is illustrated by FIG. 10. In FIG. 10A, the transmitted signal includes the P-SyS and, after a time interval $T_0$, a reference signal RS. FIG. 10B depicts the output of the receiver's matched filter, showing a primary peak at time $n_o$ and a secondary peak at time $n_0 - u$. FIG. 10C depicts the output of the receiver's matched filter when the filter has been adjusted to correlate with the reference signal RS, showing a sharp peak at time $n_0 - u + T_0$. FIG. 10D depicts the output of the receiver's matched filter when the filter has been adjusted to correlate with the reference signal RS, showing an indeterminate signal at time $n_0 + T_0$. FIG. 10E depicts the output of the receiver's matched filter when the filter has been adjusted to correlate with the reference signal RS, showing an indeterminate signal at time $n_0 + u + T_0$. For each of the three P-SyS hypotheses, the received signal is (after the fixed time interval) correlated with the known signal. The correct position—and thus also the correct position of P-SyS—is determined by the strongest correlation metric, i.e., the largest output signal from the matched filter. In order for this method to work, a known signal with a fixed timing relation to the P-SyS or equivalent synchronization signal must exist.

Yet another way to verify which peak is the correct one is to test each P-SyS timing with a differential correlator. In E-UTRAN and other communication systems, every OFDMA symbol is prefixed with a cyclic prefix. A differential correlator which has a time lag equal to the length of an OFDMA symbol and which has an integration time equal to the length of the cyclic prefix generates an output signal that has a maximum that occurs at the end of the cyclic prefix. Thus, for each of the P-SyS timing hypotheses, the output of the differential correlator is tested and the timing hypothesis resulting in the highest differential correlator output signal is selected. Differential correlators are devices that are known in the art, for example, U.S. Pat. No. 4,964,138 to Nease et al. and U.S. Pat. No. 4,800,518 to Miller, and many differential correlators can be used.

Figure 11:
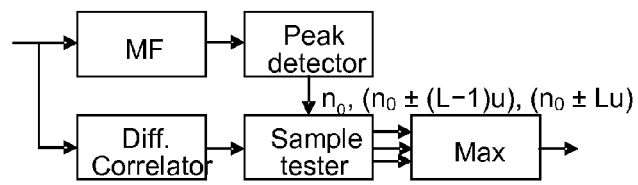
FIG. 11 is a block diagram of a portion of a receiver in a communication system.

FIG. 11 is a block diagram of an exemplary arrangement of a portion of a receiver that includes a matched filter MF, a peak detector, a differential correlator, a sample tester, and a maximum determining device as described above. For each P-SyS timing hypothesis, the output of the differential correlator matched to the cyclic prefix is tested by the sample tester. The correct P-SyS timing corresponds to that position where the differential correlator output is a maximum. The sample tester picks out the three positions (from the output of the differential correlator) determined by the peak detector. Thus, the sample tester, peak detector, and maximum determining device operate to determine the position where the differential correlator output is a maximum. To improve performance, the output signal of the differential correlator can be smoothed, e.g., by averaging over several OFDMA symbols with a suitable filter or other averager included in the sample tester. Using this method does not require complete knowledge of the actual transmitted signal since a differential correlator is used, although it will be appreciated that one needs to know that it is an OFDM symbol with a certain CP length. The exact values of the transmitted signal (i.e., the constellation points transmitted) need not be known.

Instead of using the cyclic prefix and a differential correlator matched to it, another signal with repetition in the time-domain can be used. One such possibility is the reference signal described above. In E-UTRAN, reference signals are transmitted on every sixth subcarrier, resulting in a signal that repeats itself six times within an OFDMA symbol. It is currently believed that it is enough that the signal repeats itself, and so the lag and also the integration period of the differential correlator is equal to the length of the fundamental signal period, e.g., ⅙ of the OFDMA symbol period.

Compared to the receiver structure depicted in FIG. 5, the arrangements described above in connection with FIGS. 9 and 11 have only one matched filter together with some verification circuitry. As explained above, such verification circuitry either can be a correlator that operates only over a very limited time span or a differential correlator. In either case, the verification circuitry requires only low-complexity operations, reducing the required chip area for the synchronization functions of a receiver and also the energy consumption of such synchronization circuitry.

Figure 12:
Figure 14:
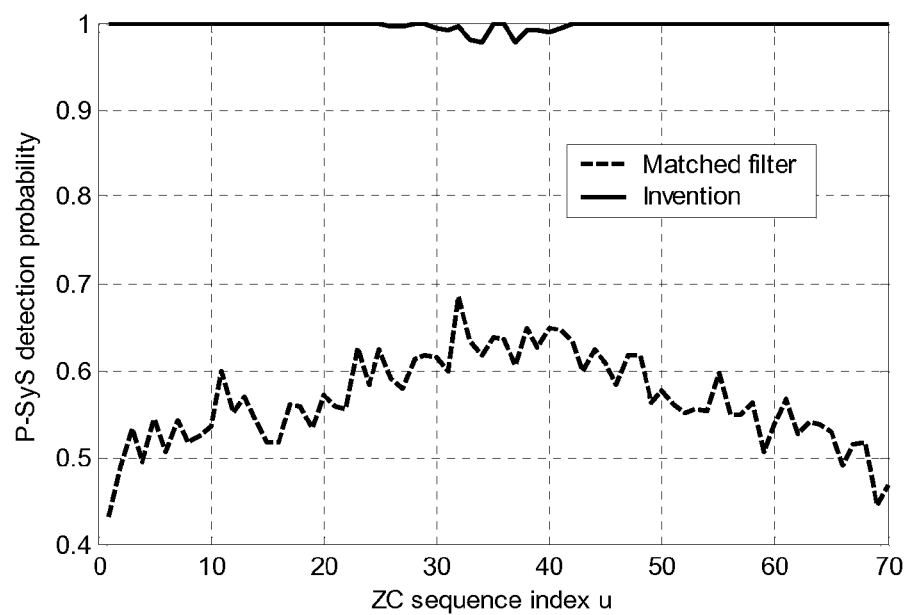

FIGS. 12, 13, and 14 are plots of P-SyS detection probability versus ZC sequence index that compare the performance of the detection methods described above with the performance of a conventional single matched filter. In the figures, the frequency offset is randomly distributed uniformly in the range of plus or minus the sub-carrier bandwidth for SNR levels of −8 dB, −4 dB, and 0 dB, respectively. A clear performance gain can be observed over the whole SNR range.

It will be appreciated that procedures described above are carried out repetitively as necessary, for example, to respond to the time-varying nature of communication channels between transmitters and receivers. To facilitate understanding, many aspects of this invention are described in terms of sequences of actions that can be performed by, for example, suitably configured elements of a programmable computer system. It will also be recognized that various actions could be performed by suitably configured specialized circuits (e.g., discrete logic gates interconnected to perform a specialized function or application-specific integrated circuits), by program instructions executed by one or more processors, or by a combination of both.

Moreover, this invention can additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions. As used here, a "computer-readable medium" can be any means that can contain, store, communicate, propagate, or transport the program for use by or in connection with the instruction-execution system, apparatus, or device. The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium include an electrical connection having one or more wires, a portable computer diskette, a random-access memory (RAM), a read-only memory (ROM), an erasable programmable read-only memory (EPROM or Flash memory), and an optical fiber.

Thus, the invention may be embodied in many different forms, not all of which are described above, and all such forms are contemplated to be within the scope of the invention. For each of the various aspects of the invention, any such form may be referred to as "logic configured to" perform a described action, or alternatively as "logic that" performs a described action.

It is emphasized that the terms "comprises" and "comprising", when used in this application, specify the presence of stated features, integers, steps, or components and do not preclude the presence or addition of one or more other features, integers, steps, components, or groups thereof.

The particular embodiments described above are merely illustrative and should not be considered restrictive in any way. The scope of the invention is determined by the following claims, and all variations and equivalents that fall within the range of the claims are intended to be embraced therein.

What is claimed is:

1. A method of identifying a correct peak in an output of a matched filter in a user equipment for a communication system, comprising the steps of:
   correlating, by the matched filter, a received orthogonal frequency division multiplex (OFDM) signal with a replica of a synchronization signal, thereby producing a correlation output signal;
   detecting peaks in the correlation output signal;
   testing the peaks at a plurality of predetermined locations that are based on properties of the synchronization signal, thereby producing a plurality of peak test signals; and
   identifying the correct peak based on the maximum of the peak test signals.

2. The method of claim 1, wherein the synchronization signal is a Zadoff-Chu sequence and the predetermined locations are $n_0$, $n_0 \pm ul$ modulo N, and $n_0 \pm u(l-1)$ modulo N, where $n_0$ indicates a location of the correct peak; u is an index of the Zadoff-Chu sequence; L is a positive integer that is a smallest multiple of a sub-carrier bandwidth df that is larger than a magnitude $|f_{OS}|$ of a frequency offset $f_{OS}$ of the user equipment with respect to the received signal; $l=1, 2, \ldots, L$; and $(L-1)df \leq |f_{OS}| \leq Ldf$.

3. The method of claim 1, wherein the synchronization signal is a Zadoff-Chu sequence and the predetermined locations are $n_0$ and $n_0 \pm u$, where $n_0$ indicates a location of the correct peak; u is an index of the Zadoff-Chu sequence; and a magnitude of a frequency offset of the user equipment with respect to the received signal is less than or equal to a sub-carrier bandwidth.

4. The method of claim 1, wherein the step of testing the peaks includes correcting a second received OFDM signal based on a synchronization timing assumed at each of the plurality of predetermined locations.

5. The method of claim 1, wherein the step of testing includes correlating the received signal with an expected signal that has a known position relative to the synchronization signal.

6. The method of claim 5, wherein correlating the received signal with the expected signal is carried out around the predetermined locations.

7. The method of claim 1, wherein the step of testing the peaks includes differentially correlating the received signal, thereby producing a differential correlation output signal.

8. The method of claim 7, wherein the step of testing the peaks further includes smoothing the differential correlation output signal.

9. The method of claim 7, wherein the received signal is differentially correlated with a cyclic prefix, a reference signal, or a time-domain-repetitive signal.

10. An apparatus in a receiver for identifying a correct peak in an output of a matched filter, comprising:
    the matched filter configured to correlate a received orthogonal frequency division multiplex (OFDM) signal with a replica of a synchronization signal, and thereby to produce a correlation output signal;
    a peak detector configured to detect peaks in the correlation output signal; and
    means for testing the peaks at a plurality of predetermined locations that are based on properties of the synchronization signal, and thereby to produce a plurality of peak test signals, and identifying the correct peak based on the maximum of the peak test signals.

11. The apparatus of claim 10, wherein the synchronization signal is a Zadoff-Chu sequence and the predetermined locations are $n_0$, $n_0 \pm ul$ modulo N, and $n_0 \pm u(l-1)$ modulo N, where $n_0$ indicates a location of the correct peak; u is an index of the Zadoff-Chu sequence; L is a positive integer that is a smallest multiple of a sub-carrier bandwidth df that is larger than a magnitude $|f_{OS}|$ of a frequency offset $f_{OS}$ of the receiver with respect to the received signal; $l=1, 2, \ldots, L$; and $(L-1)df \leq |f_{OS}| \leq Ldf$.

12. The apparatus of claim 10, wherein the testing means is configured to test the peaks by correcting a second received OFDM signal based on a synchronization timing assumed at each of the plurality of predetermined locations.

13. The apparatus of claim 10, wherein the testing means is configured to test the peaks by correlating the received signal with an expected signal that has a known position relative to the synchronization signal.

14. The apparatus of claim 13, wherein the testing means is configured to correlate the received signal with the expected signal around the predetermined locations.

15. The apparatus of claim 10, wherein the testing means is configured to test the peaks by differentially correlating the received signal, thereby producing a differential correlation output signal.

16. The apparatus of claim 15, wherein the testing means is further configured to test the peaks by smoothing the differential correlation output signal.

17. The apparatus of claim 15, wherein the received signal is differentially correlated with a cyclic prefix, a reference signal, or a time-domain-repetitive signal.

18. A non-transitory computer-readable medium coded with a computer program which, when executed by a computer, causes the computer to perform a method of identifying a correct peak in an output of a matched filter in a user equipment for a communication system, wherein the method comprises the steps of:

identifying the correct peak based on the maximum of the peak test signals with a replica of a synchronization signal, thereby producing a correlation output signal;

detecting peaks in the correlation output signal;

testing the peaks at a plurality of predetermined locations that are based on properties of the synchronization signal, thereby producing a plurality of peak test signals; and identifying the correct peak based on the maximum of the peak test signals.

19. The medium of claim 18, wherein the synchronization signal is a Zadoff-Chu sequence and the predetermined locations are $n_0$, $n_0 \pm uI$ modulo $N$, and $n_0 \pm u(I-1)$ modulo $N$, where $n_0$ indicates a location of the correct peak; $u$ is an index of the Zadoff-Chu sequence; $L$ is a positive integer that is a smallest multiple of a sub-carrier bandwidth $df$ that is larger than a magnitude $|f_{OS}|$ of a frequency offset $f_{OS}$ of the user equipment with respect to the received signal; $I=1, 2, \ldots, L$; and $(L-1)df \leq |f_{OS}| Ldf$.

20. The medium of claim 18, wherein the step of testing the peaks includes correcting a second received OFDM signal based on a synchronization timing assumed at each of the plurality of predetermined locations.

21. The medium of claim 18, wherein the step of testing includes correlating the received signal with an expected signal that has a known position relative to the synchronization signal.

22. The medium of claim 18, wherein the step of testing the peaks includes differentially correlating the received signal, thereby producing a differential correlation output signal.

* * * * *

UNITED STATES PATENT AND TRADEMARK OFFICE
CERTIFICATE OF CORRECTION

| | | |
|---|---|---|
| PATENT NO. | : 8,144,819 B2 | Page 1 of 1 |
| APPLICATION NO. | : 12/024765 | |
| DATED | : March 27, 2012 | |
| INVENTOR(S) | : Baldemair et al. | |

It is certified that error appears in the above-identified patent and that said Letters Patent is hereby corrected as shown below:

In Column 7, Line 26, delete "$n_0 Lu.$" and insert -- $n_0 + Lu.$ --, therefor.

In Column 11, Lines 17-18, in Claim 18,
delete "identifying the correct peak based on the maximum of the peak test signals" and insert -- correlating, by the matched filter, a received orthogonal frequency division multiplex (OFDM) signal --, therefor.

In Column 12, Line 11, in Claim 19, delete "$|f_{OS}| Ldf.$" and insert -- $|f_{OS}| < Ldf.$ --, therefor.

Signed and Sealed this
Eleventh Day of September, 2012

David J. Kappos
*Director of the United States Patent and Trademark Office*